United States Patent [19]

Futterer

[11] 4,193,184
[45] Mar. 18, 1980

[54] METHOD OF MANUFACTURING A STATOR FOR AN ELECTRICAL MACHINE

[75] Inventor: Bodo Fütterer, Lucerne, Switzerland

[73] Assignee: Interelectric AG, Sachseln, Switzerland

[21] Appl. No.: 942,765

[22] Filed: Sep. 15, 1978

Related U.S. Application Data

[63] Continuation-in-part of Ser. No. 739,264, Nov. 5, 1976, Pat. No. 4,125,791.

[30] Foreign Application Priority Data

Nov. 11, 1975 [DE] Fed. Rep. of Germany ....... 2550640

[51] Int. Cl.$^2$ ............................................. H02K 15/02
[52] U.S. Cl. ......................................... 29/596; 310/42
[58] Field of Search ................... 29/596, 598; 156/297; 310/42, 154, 155, 266

[56] References Cited

U.S. PATENT DOCUMENTS

| | | | |
|---|---|---|---|
| 3,793,548 | 2/1974 | Faulhaber | 310/266 |
| 3,818,586 | 6/1974 | Harkness et al. | 29/598 |
| 3,914,859 | 10/1975 | Pierson | 29/596 |

*Primary Examiner*—Carl E. Hall
*Attorney, Agent, or Firm*—Frederick E. Bartholy

[57] ABSTRACT

A stator having a plurality of permanent magnets with a cylindrically shaped outer surface and with at least one planar opposite surface is manufactured to close tolerances of the air gap with the aid of a plurality of ferromagnetic link members, equal in number to the number of permanent magnets and adapted to come into planar contact with those surfaces of said permanent magnets which are pointing away from the air gap. The permanent magnets are placed into a cylindrically shaped sleeve, the inner diameter of which corresponds to the desired inner diameter of the air gap of the stator. A sleeve of a ferromagnetic material may be used for holding said permanent magnets in intimate contact with the sleeve. The link members are shaped so as to be brought into generally planar contact with at least part of the inner surface of two adjacent ones of the permanent magnets. An adhesive is used to secure the link members to the permanent magnets. The so formed permanent sub-assembly may be secured in an known manner to an end plate of the stator housing. A flux return ring is also secured to that end plate. The sleeve is withdrawn from said permanent magnets after the adhesive has cured and preferably after the permanent magnet subassembly has been fixed to the end plate. The sleeve may be formed so as to have an outer diameter corresponding to the outer diameter of the desired air gap. By this, a close toleranced air gap will be provided even if the individual permanent magnets are not formed for high tolerances.

7 Claims, 4 Drawing Figures

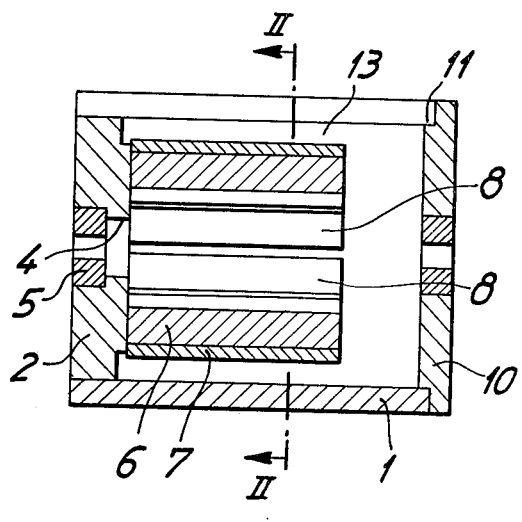
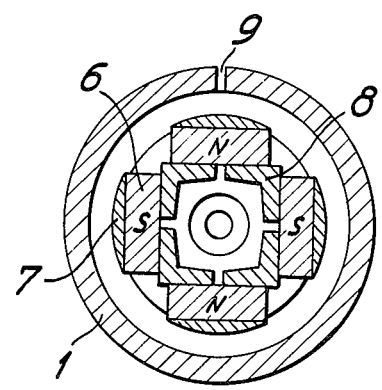
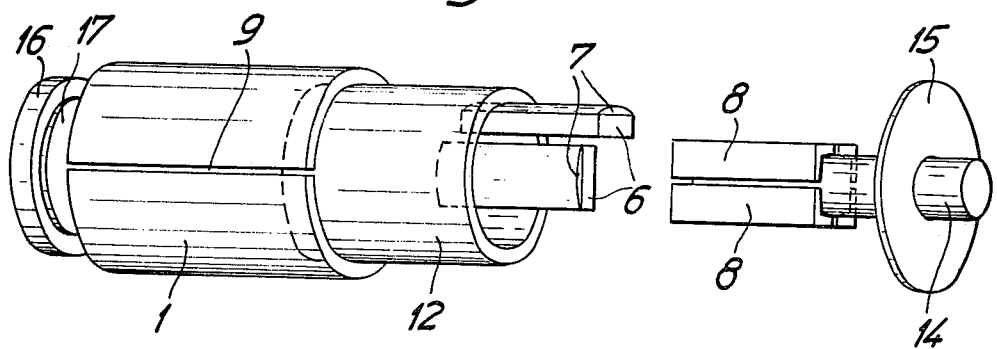
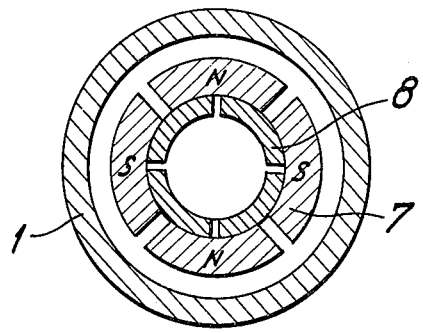

METHOD OF MANUFACTURING A STATOR FOR AN ELECTRICAL MACHINE

CROSS-REFERENCES

This application is a continuation-in-part of my pending application Ser. No. 739,264 filed Nov. 5, 1976, now U.S. Pat. No. 4,125,791.

BACKGROUND OF THE INVENTION

Stators having a permanent magnet system comprising a plurality of individual permanent magnets are known in the art. In a known stator (U.S. Pat. No. 3,237,036) a plurality of permanent magnets are united into a star-shaped assembly held together by strap rings and supported on a radially inner hollow stem. The permanent magnets are made in a substantially rectangular parallelepiped form and are magnetized in a circumferential direction. Wedge-shaped pole pieces are arranged between adjacent ones of the permanent magnets. The unit formed by the permanent magnets and pole pieces is surrounded by a flux return ring, leaving a cylindrical air gap. No provision is made to allow an adjustment of the pole pieces to close tolerances of the air gap. Therefore, the permanent magnets as well as the pole pieces must be machined to close tolerances in order to get a close toleranced air gap.

In order to reduce the cost of manufacture, a number of permanent magnets have been fixed around an inner magnetic conductive piece. Such a construction, however, requires a precise treatment of the surface of the permanent magnets and of the inner magnetic conductive piece, and thus the reduction of costs of manufacture is very poor.

BRIEF SUMMARY OF THE INVENTION

It is an object of the invention to provide a method for manufacturing a stator for an electrical machine, in which the air gap may be formed to close tolerances without the necessity of using components having correspondingly close tolerances.

It is another object of the invention to allow the manufacture of a stator, in which an individual type of permanent magnets and link means may be used for manufacturing stators having different widths of the air gap.

Still other object is the provision of a method of manufacturing a stator in which a cylindrical sleeve is used to adjust the position of the individual components of the stator to the desired dimension of the air gap prior to securing the components to one another.

Those and other objects are achieved by a method in which a plurality of permanent magnets are placed into contact with the inner surface of a cylindrical sleeve of the same radial dimensions as the desired air gap. The radially inwardly facing surfaces of the permanent magnets have a planar surface, and a plurality of ferromagnetic link members equal in number to the number of permanent magnets have a surface configuration adapted to establish a planar contact of each of the link members with two adjacent ones of the permanent magnets. The permanent magnets and the link members are secured to one another by a bonding agent and are fixed to an end plate of the stator. A tube-like flux return ring is secured with one of its end faces to the end plate in a coaxial relationship to the permanent magnets, thus forming a cylindrical air gap, into which a tubular, ironless rotor may be inserted.

The cylindrical sleeve may be made of a ferromagnetic material, thus allowing the permanent magnets to adhere to the inner surface of the sleeve by magnetic attractive forces, before the link members are brought into contact with the planar surfaces of the permanent magnets. Such a method of manufacture allows the correct centering of the permanent magnets and an optimum approximation of the cylindrical outer surface of the same to the inner surface of the sleeve prior to fixedly securing the permanent magnets to the link members.

The permanent magnets and the link members may be secured to one another and to the end face plate by an adhesive. By this, the main components of the stator may be fixed together in a single step of manufacture.

In order to facilitate the mounting of the link members to the permanent magnets, the link members may be held at the circumference of a magnetic mandrel and may then be inserted into the space left free by the permanent magnets when placed against the inner surface of the sleeve.

The outer flux return ring may be provided with a longitudinal slot over the whole of its length in order to adjust its inner diameter to the outer diameter of the desired air gap, as has been described in my co-pending application Ser. No. 901,609, filed May 1, 1978, which is a Continuation-in-part application of my earlier application Ser. No. 594,768, filed July 10, 1975, now abandoned.

BRIEF DESCRIPTION OF THE DRAWINGS

FIG. 1 is a longitudinal sectional view of a stator manufactured according to the invention;

FIG. 2 is a cross-sectional view of the stator taken on the line II—II of FIG. 1;

FIG. 3 is a perspective view for illustrating the method of manufacture; and

FIG. 4 is a cross-sectional view similar to FIG. 2 of a modified embodiment.

DETAILED DESCRIPTION OF A PREFERRED EMBODIMENT

FIGS. 1 and 2 show a stator of a dc-motor, which comprises a cylindrical ferromagnetic flux return ring 1, a first end plate 2 and a permanent magnet system 3. The first end plate 2 is disk-shaped and made of aluminum. It has a central recessed bore 4, into which a bearing 5 is inserted. Fixed to one side face of end plate 2 is the permanent magnet system, which comprises four permanent magnets 6 of a parallelepiped configuration. Fixed to one side face of each of the permanent magnets is a pole piece 7, which has a cylindrically curved surface. Link members 8 are provided, which have two adjacent planar surfaces forming an angle with one another and adapted to come into contact with the radially inner surfaces of the permanent magnets 6.

The first end plate 2 is machined at its outer circumference to a diameter corresponding to the outer diameter of the desired air gap. The ferromagnetic flux return ring 1 is provided with a longitudinal slot 9 extending over the whole of its length. The flux return ring is pressed onto the outer rim of end plate 2 and by this is widened to the desired diameter. A second end plate 10 has a radially outwardly facing shoulder 11 which is adapted to support the other end of the flux return ring 1.

The method of manufacture of such a stator will now be described with reference to FIG. 3. As may be seen from FIG. 3, a hollow cylindrical sleeve is provided, which sleeve has an outer and inner diameter corresponding to the desired air gap 13. The flux return ring 1 is pressed over the cylindrical sleeve 12, and the radial slot 9 allows widening of the flux return ring so that the inner surface of the same comes into intimate contact with the outer surface of the sleeve 12.

The permanent magnets 6 are secured with one of their side faces to a pole piece 7. However, it is within the scope of invention to use permanent magnets which form integral parts having a cylindrical outer surface and a planar or a cylindrical opposing surface. In the example as herein described, the permanent magnets 6 are each fixed to a pole piece 7 by an adhesive. The so formed sub-assemblies are inserted into the interior of the sleeve 12 in a circumferentially equidistant relationship. Due to the fact that the flux return ring is already place around the sleeve 12, the permanent magnet units will be loosely held in their position by magnetic attractive forces between the permanent magnets 6 on the one hand and the flux return ring 1 on the other hand. It is considered to be within the scope of the invention to use a sleeve 12 made of a ferromagnetic material. Thus, the flux return ring 1 may not necessarily be placed around the sleeve 12 prior to inserting the permanent magnet units 6, 7.

As is shown in the righthand part of FIG. 3, a cylindrical mandrel 14 is provided, which serves to hold four link members equidistantly arranged around its outer surface. The mandrel 14 may be a permanent magnet or an electromagnet.

The radially outer surfaces of the link members 8 are covered with an adhesive. Alternatively or additionally, the radially inner surfaces of the permanent magnets 6 may be provided with an adhesive coating. Thereafter, the mandrel 14 and the link members 8 held thereon are inserted into the space left free by the permanent magnet units 6, 7. The mandrel 14 may be guided coaxially to the sleeve 12 in order to prevent that the link members 8 contact the permanent magnets during the insertion into the free space. If the link members have been inserted into their desired axial position, the mandrel 14 is retracted while the link members 8 are being prevented from being withdrawn with the mandrel by any known means, for instance by an apertured plate 15 made of a non-magnetic material and placed around the mandrel 14 to serve as an abutment for the link members 8.

If the mandrel 14 is provided with an electromagnet, the same may be deenergized, thus allowing the link members 8 to come into contact with the permanent magnets 6 due to the attractive forces of the same.

The outer rim 16 of the first end plate 2 and the side face 17 of the same are provided with a adhesive coating. Thereafter, the flux return ring 1 is placed over the rim 16 and the permanent magnet system is pressed against the side face 17 of the end plate 2. The adhesive is allowed to cure. Thereafter, the sleeve 12 is retracted and the stator is finished, with the exception of the second end plate which will be fixed to the free rim of the flux return ring after a rotor has been inserted (not shown).

As may be seen, the method of manufacture as described hereinbefore assures close tolerances of the dimensions of the air gap, since the permanent magnet units 6, 7 are held together by the link members 8 in a position, in which the outer cylindrical surface of the permanent magnet units 6, 7 are in intimate contact with the sleeve 12. Thus, the individual components need not be fabricated to close tolerances. It is apparent that the method of manufacture according to the invention allows mass production of stators with high tolerances with a minimum of costs.

The invention is not restricted to the manufacture of stators having four permanent magnets. When a greater number of permanent magnets are used, the adjacent outer surfaces of each of the link members 8 should form an angle of 360, /n, wherein n is the number of permanent magnets.

Alternatively, the radially inner surfaces of the permanent magnets and the outer surfaces of the link members may be cylindrically shaped, as is shown in the cross-sectional view of FIG. 4. Although such a configuration is considered to be within the scope of the invention, it should be noted that a planar configuration of the contacting surfaces of the permanent magnets and of the link members will lead to the best results and will allow for the compensation of higher tolerances in the dimensions of the components.

It should also be noted that the order of the individual steps of manufacture may be altered. For instance, the permanent magnets 6, the pole pieces 7, and the link members 8 may be bonded together simultaneously in one step with the aid of the sleeve 12, and the so formed sub-assembly may be bonded to the side face 17 of the first end plate. Thereafter, the flux return ring may be positioned over the sleeve 12 and pressed onto the rim 16 of the first end plate 2.

Also, it is not necessary to use a mandrel 14. Instead, the link members 8 may be placed into the desired position against the permanent magnets 6 by any known method, for instance manually.

I claim:

1. A method for manufacturing a stator for electrical machines, which stator comprises an outer ferromagnetic flux return means, a permanent magnet system positioned inside of said flux return means in a coaxial and equidistant relationship thereto and having at least four permanent magnets, each shaped cylindrically at its outer surface, and an end plate supporting said magnetic flux return means and said permanent magnet system, comprising the steps of securing said flux return means to said end plate, inserting said permanent magnets into the interior of a sleeve, the inner diameter of which corresponds to the desired outer diameter of the permanent magnet system, providing a plurality of ferromagnetic link members equal in number to the number of permanent magnets, each of said link members being adapted to come into planar contact with the radially inner surface of two adjacent ones of said permanent magnets, applying a bonding agent to at least one of the surfaces of said permanent magnets and of said link means, bringing each of said link means into contact with two adjacent ones of said permanent magnets until the bonding agent has cured, securing the so formed permanent magnet system to the end plate, and withdrawing said sleeve from said permanent magent system.

2. A method as claimed in claim 1, comprising the additional step of forming the outer surface of the sleeve so as to conform in diameter with the inner diameter of the magnetic flux return means.

3. A method as claimed in claim 1, wherein the permanent magnet system is secured with one of its side faces to said end plate by an adhesive and wherein said flux return means is a flux return ring and wherein said flux return ring is secured to said end plate prior to securing the permanent magnet system to said end plate.

4. A method of manufacturing a stator for electrical machines, comprising the steps of forming a cylindrically shaped sleeve, the inner surface of which corresponds to the desired inner diameter of the air gap of the stator, forming at least four permanent magnets with a cylindrically shaped outer surface and with at least one planar opposite surface, forming a plurality of ferromagnetic link members equal in number to the number of permanent magnets and adapted to come into planar contact with said opposite surface of said permanent magnets, placing said permanent magnets into the interior of said sleeve in a circumferentially equidistant relationship, with the cylindrically outer surfaces butting against the inner surface of said sleeve, applying an adhesive to at least one of said planar surfaces of said permanent magnets and of said link means, bringing each of said link means into contact with two adjacent ones of said permanent magnets, allowing the adhesive to cure, securing a tube-like flux return ring with one of its end faces to an end plate, inserting said sleeve and said permanent magnets and link members held therein into said ring, securing the permanent magnets to said end plate, and withdrawing said sleeve from said permanent magnets.

5. A method as claimed in claim 4, wherein said permanent magnet system is secured with one of its side faces to said end plate by an adhesive.

6. A method of manufacturing a stator for electrical machines, comprising the steps of forming a cylindrically shaped ferromagnetic sleeve, the inner surface of which corresponds to the desired inner diameter of the air gap of the stator, forming at least four permanent magnets with a cylindrically shaped outer surface and with at least one planar opposite surface, forming a plurality of ferromagnetic link members equal in number to the number of permanent magnets and adapted to come into planar contact with said planar surface of two adjacent ones of said permanent magnets, placing said permanent magnets into the interior of said sleeves in a circumferentially equidistant relationship, with the cylindrically outer surfaces butting against the inner surface of said sleeve and being held against the same by magnetic attractive forces, applying an adhesive to at least one of said planar surfaces of said permanent magnets and of said link members, bringing each of said link members into contact with two adjacent ones of said permanent magnets, allowing said adhesive to cure, securing a ferromagnetic flux return ring having an inner diameter equalling the outer diameter of the air gap to an end plate, securing the sub-assembly formed of said permanent magnets and of said link members to said end plate, and withdrawing said sleeve from said permanent magnets.

7. A method as claimed in claim 6, wherein said link members are brought into contact with the outer surface of a magnetic mandrel prior to bringing said link members into contact with two adjacent ones of said permanent magnets.

* * * * *